April 19, 1927. 1,625,052
F. A. RAY
TANK FOR SEPARATING OIL AND WATER FROM GAS
Filed Sept. 5, 1925
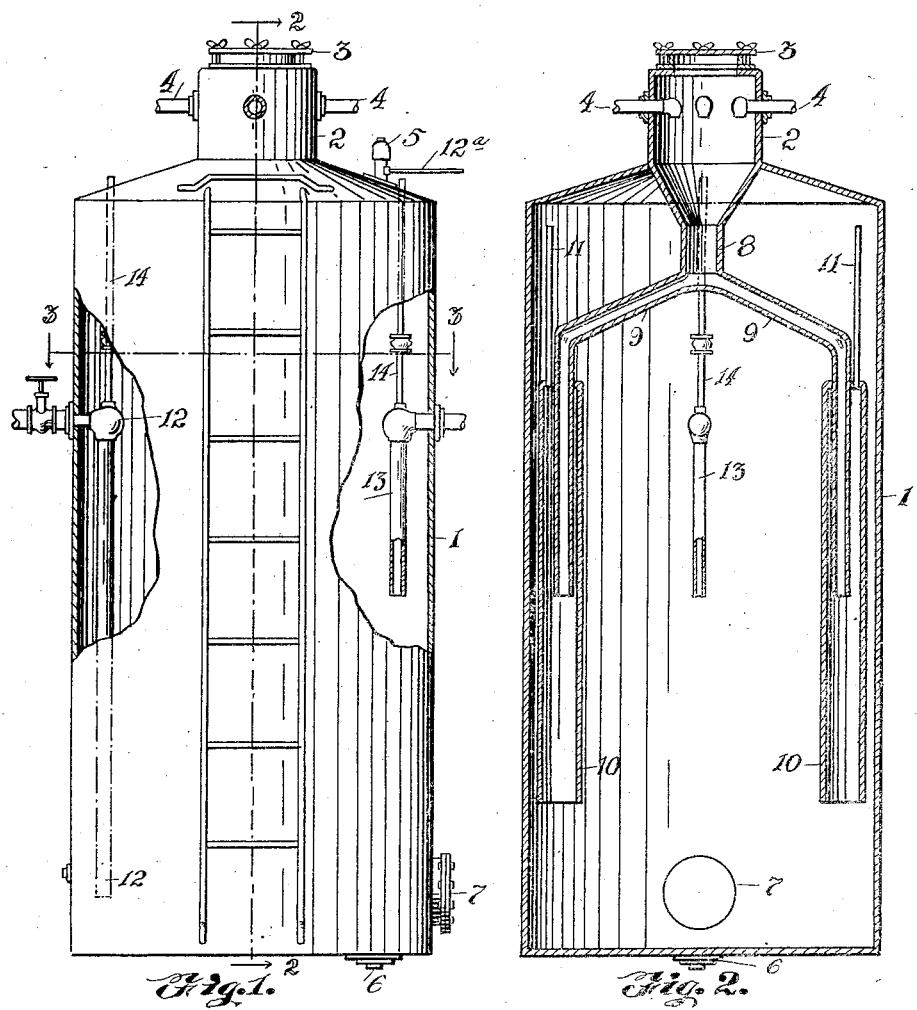
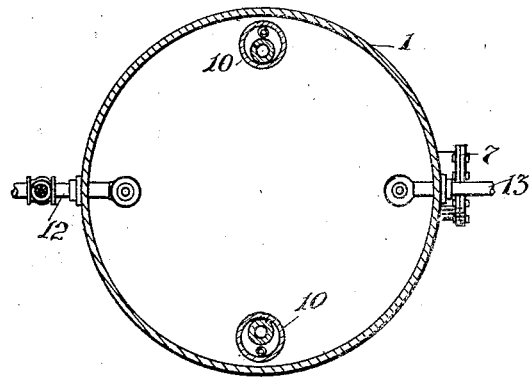

Patented Apr. 19, 1927.

1,625,052

UNITED STATES PATENT OFFICE.

FELBERT A. RAY, OF WICHITA FALLS, TEXAS.

TANK FOR SEPARATING OIL AND WATER FROM GAS.

Application filed September 5, 1925. Serial No. 54,613.

The present invention relates to useful improvements in tanks especially designed for the purpose of separating oil and water from gas, commonly used in connection with oil field work, and it refers more particularly to a gas trapping arrangement for tanks of the character designated, the object being primarily to positively prevent agitation, through the ingress of gas with the fluid, of the basic sediment and fluid contents of the tank.

The invention further comprehends an arrangement as set forth having particular significance when taken together with certain improvements in tanks described and claimed in Letters Patent granted the petitioner hereof on May 6, 1924, bearing No. 1,492,579, as well as prior and intervening applications of similar subject matter.

With the foregoing and other objects and advantages in view, the invention has particular reference to certain novel features of construction and assembly of parts, by which said objects are attained, which will be manifested in the course of the following detail description and illustrated in the appended drawings, in which:

Figure 1 represents a view in vertical elevation, of a tank upon which the invention is attached, having portions cut away to illustrate more clearly the interior fittings thereof.

Figure 2 is a similar view in vertical section on lines 2—2 of Figure 1, illustrating the position of the invention therein, and Figure 3 is a cross-section on lines 3—3 of Figure 1.

In proceeding more in detail, the reference character 1 denotes a cylindrical tank of the usual construction, upon the top of which is situated a dome 2, having therein a "thief hole" 3, and receiving the delivery ends of a series of pipes 4. Adjacent the dome 2, the tank is further provided with a pop-off valve 5. The bottom of the tank is equipped with the usual drain plug 6, also a port 7 provided for convenience in cleaning the settlings from the tank.

It will be observed in Figure 2 that the dome 2 is conical in form at its base, where it engages a pipe 8, having integral therewith a pair of pipes 9, which latter extend obliquely toward opposing walls of the tank, where they are bent and directed downwardly along the said walls an equal distance. Through these pipes the fluid is passed into the tank.

It has been previously determined that unless certain expediencies are established interiorly of the tank to segregate the ingress of gas with the fluid, from that already contained within the tank, a maximum disturbance of the fluid and basic sediment takes place, such agitation and disturbance resulting in inefficient decomposition of the fluid mixture and an inferior grade of oil is the product. Hence, it has been found necessary in order to obviate the foregoing disadvantage, to provide intermediate the depending ends of the obliquely extending pipes 9, a barrel 10, which latter is suitably affixed to the walls of the tank 1, and into which the pipes 9 extend approximately half its length. The tops of these barrels are closed around the pipes to prevent ingress of gas contained within the tank above the fluid level, aside from that entering through the pipes 9 with the fluid. This latter gas is received within the barrels 10 and conveyed upwardly, where it emerges through the pipes 11, situated in the tops of the barrels 10, and into the space above the level of the fluid, which latter, in most cases is found to assume a level within the pipe 13, approximately 28 inches above the level of the bulk of the fluid within the tank proper, in accordance however, with the pressure of gas imposed thereon.

Therefore, it is clearly obvious that the gas is not required to be discharged with the fluid at the bottom of the tank and rise to the top, as has been previously done, but is entrapped within the barrels 10, as in the manner described, thus to prevent agitation of the mixture of oil, water and sediment by its upward passage therethrough.

Upon entering its assigned space above the level of the fluid, the oil, being of lighter weight than water, is forced by the gas to assume a lower level, thus forcing the water below the oil body upward and through the outlet pipe 12, to be drained from the tank, and gas in excess of the amount required to cause the action above described, will be automatically released from the tank through the pop-off valve 5, as previously mentioned, or through a line 12ª, entering the pipe immediately below the pop-off valve 5, which is employed as a conductor of gas pressure to various points throughout the field, to be utilized in operating engines and other analogous uses. It will be observed further, that the ends of the pipes 12 and 13 are directed downwardly, which affords a liquid seal to prevent the fluid from siphoning therefrom.

The tank 1 is further shown as being provided with an oil line vacuum release pipe 14, situated upon the pipe 13, as well as a similar pipe 14 disposed upon the pipe 12, the obvious purpose being to prevent siphoning of fluid through these respective pipes.

The invention does not include broadly the construction of a separating tank of the character described in the foregoing, but does include broadly the means for segregating the gas from the liquid contents of the tank to prevent agitation of said contents, as set forth in the appended claims, and it should be understood that certain minor changes and modifications may be resorted to without departing from the spirit and intent of the invention as set forth in said claims.

I claim:

1. In a tank of the character described for separating gas and water from oil, the combination with the fluid inlets of said tank of tubular members concentrically surrounding said inlets and closed at their tops to prevent ingress of gas therethrough, means to elevate the entrapped gas within said tubular members and pass the same above the level of the fluid within said tank and means for urging water from said tank by the pressure imposed upon the fluid by said gas.

2. In a tank for separating oil and water from gas, the combination with the fluid inlet pipes of means circumferentially surrounding the lower extremities of said inlet pipes to entrap gas and prevent the same from agitating the contents of said tank; said means comprising barrels having their ends closed about said inlet pipes at a spaced point above the discharge ends thereof, means to permit said gas to escape from said entrapping means above the fluid level of said tank and means for ejecting water from said tank in accordance with the pressure imposed upon the fluid by the gas contents thereof.

3. In a tank for separating water and oil from gas; means in combination with the fluid inlet pipes thereof arranged to entrap ingressing gas and prevent the same from rising through the contents of said tank; said means comprising tubes disposed in concentric relationship about said fluid inlet pipes arranged to receive said gas and convey the same upwardly above the fluid level of said tank and means for applying the pressure of said gas against the fluid contents thereof to eject the water content from said tank.

4. In a tank for segregating liquids from gas; means to prevent disturbance of said liquids by said gas during passage of the latter therethrough, in combination with the inlets of said tank, said means including tubular members circumferentially surrounding the lower extremities of said inlets and closed at their tops to entrap gas ingressing with said liquid and means to permit the same to egress from said tubular members to a point above the liquid level of said tank and means for applying the pressure of said gas against the fluid contents thereof to eject the water content from said tank.

5. In a tank for separating oil and water from gas; the combination with the inlets of said tank of a circumferential housing for said inlets and closed at its top to interclude the gas entering with the fluid and means to pass the same upwardly above the normal level assumed by said fluid within the tank and means for applying the pressure of said gas against the fluid to cause the water content beneath the fluid to be ejected from said tank.

6. In a tank for separating aeriform fluids from water and oil, the combination with the inlets of said tank of a barrel concentrically surrounding said inlets to intercept said aeriform fluid, means to pass the latter upward above the liquid level of said water and oil, irrespective of the passage of the latter and means for ejecting the water content of said tank by the pressure of said gas on the fluid therein.

7. In a tank having a fluid inlet tube, means to intercept gas entering through said inlet with the fluid and prevent the same from agitating the contents of said tank, said means including a barrel-like member concentrically arranged upon said inlet interiorly of said tank and having its upper end closed about said inlet tube, means directed upwardly from the said closed end of the barrel to pass the gas above the liquid level of said tank and means for ejecting the water from said tank by the pressure of said gas against the fluid therein.

8. In a tank having a fluid inlet pipe, means in combination therewith to interclude gas ingressing with the fluid, said means comprising a cylindrical shell circumferentially surrounding said inlet pipe at its discharge end and closed at its top to afford an intermediate annular chamber for the reception of said gas, means directed upwardly from the closed end of said shell to permit the passage of gas entrapped therein above the liquid level of said tank and means for applying the pressure of said gas above said liquid level to cause the water content of said tank to rise and be ejected therefrom.

In testimony whereof I affix my signature.

FELBERT A. RAY.